(12) United States Patent
Okada et al.

(10) Patent No.: US 11,361,888 B2
(45) Date of Patent: Jun. 14, 2022

(54) SAMARIUM-IRON-NITROGEN MAGNET POWDER AND METHOD FOR MANUFACTURING SAME

(71) Applicants: Shusuke Okada, Aichi (JP); Kenta Takagi, Aichi (JP); Yasushi Enokido, Tokyo (JP); Yoshinori Fujikawa, Tokyo (JP); Ryuji Hashimoto, Tokyo (JP)

(72) Inventors: Shusuke Okada, Aichi (JP); Kenta Takagi, Aichi (JP); Yasushi Enokido, Tokyo (JP); Yoshinori Fujikawa, Tokyo (JP); Ryuji Hashimoto, Tokyo (JP)

(73) Assignees: National Institute of Advanced Industrial Science and Technology, Tokyo (JP); TDK Corporation, Tokyo (JP)

( * ) Notice: Subject to any disclaimer, the term of this patent is extended or adjusted under 35 U.S.C. 154(b) by 103 days.

(21) Appl. No.: 16/615,511

(22) PCT Filed: May 29, 2018

(86) PCT No.: PCT/JP2018/020553
§ 371 (c)(1),
(2) Date: Nov. 21, 2019

(87) PCT Pub. No.: WO2018/221512
PCT Pub. Date: Dec. 6, 2018

(65) Prior Publication Data
US 2020/0118722 A1 Apr. 16, 2020

(30) Foreign Application Priority Data
May 30, 2017 (JP) .............................. JP2017-106990

(51) Int. Cl.
*H01F 1/059* (2006.01)
*B22F 9/20* (2006.01)
(Continued)

(52) U.S. Cl.
CPC ................ *H01F 1/059* (2013.01); *B22F 1/05* (2022.01); *B22F 1/145* (2022.01); *B22F 9/20* (2013.01)

(58) Field of Classification Search
CPC ...... H01F 1/059; B22F 1/0011; B22F 1/0088; B22F 9/20; B22F 1/02; B22F 1/0018;
(Continued)

(56) References Cited

U.S. PATENT DOCUMENTS 6,926,963 B2 8/2005 Ohmori et al.

FOREIGN PATENT DOCUMENTS

JP H05-175023 7/1993
JP H05-190311 7/1993
(Continued)

OTHER PUBLICATIONS

JP-2010270379-A English translation (Year: 2010).*
(Continued)

*Primary Examiner* — Kevin E Yoon
*Assistant Examiner* — Ricardo D Morales
(74) *Attorney, Agent, or Firm* — IPUSA, PLLC

(57) ABSTRACT

One embodiment of the present invention is that in samarium-iron-nitrogen magnet powder, a non-magnetic phase is formed on a surface of the samarium-iron-nitrogen magnet phase, and an arithmetic mean roughness Ra of the surface is 3.5 nm or less.

5 Claims, 7 Drawing Sheets

(51) Int. Cl.
  *B22F 1/05*   (2022.01)
  *B22F 1/145*  (2022.01)

(58) Field of Classification Search
  CPC .. B22F 2999/00; B22F 2998/10; C22C 38/00; C22C 38/001; C22C 38/005; C22C 33/0278; C01G 49/00
  See application file for complete search history.

(56) References Cited

FOREIGN PATENT DOCUMENTS

| JP | H10-060505 | 3/1998 |
|---|---|---|
| JP | 2001-207201 | 7/2001 |
| JP | 2003-007521 | 1/2003 |
| JP | 2004-031761 | 1/2004 |
| JP | 2005-223263 | 8/2005 |
| JP | 2007-119909 | 5/2007 |
| JP | 2007-270303 | 10/2007 |
| JP | 2010270379 A * | 12/2010 |
| JP | 2016-037611 | 3/2016 |

OTHER PUBLICATIONS

Maeda et al. ("Electromagnetic microwave absorption properties of a fine structure formed from the $Sm_2Fe_{17}$ compound after disproportionation in air or nitrogen." Materials Transactions 42.3 (2001): 446-449.) (Year: 2001).*

International Search Report for PCT/JP2018/020553 dated Jul. 10, 2018.

Shusuke Okada et al, "Preparation of submicron-sized $Sm_2Fe_{17}N_3$ fine powder with high coercivity by reduction-diffusion process", Journal of Alloys and Compounds 695 (2017) 1617-1623.

Y. Hirayama et al, "High coercivity $Sm_2Fe_{17}N_3$ submicron size powder prepared by polymerized-complex and reduction-diffusion process", Scripta Materialia 120 (2016) 27-30.

S.Tada et al, "High-Coercivity Anisotropic SmFeN Magnetic Materials", Proceedings of the 22th International Workshop on Rare-Earth Permanent Magnets and their Applications (2012) 48-53.

* cited by examiner

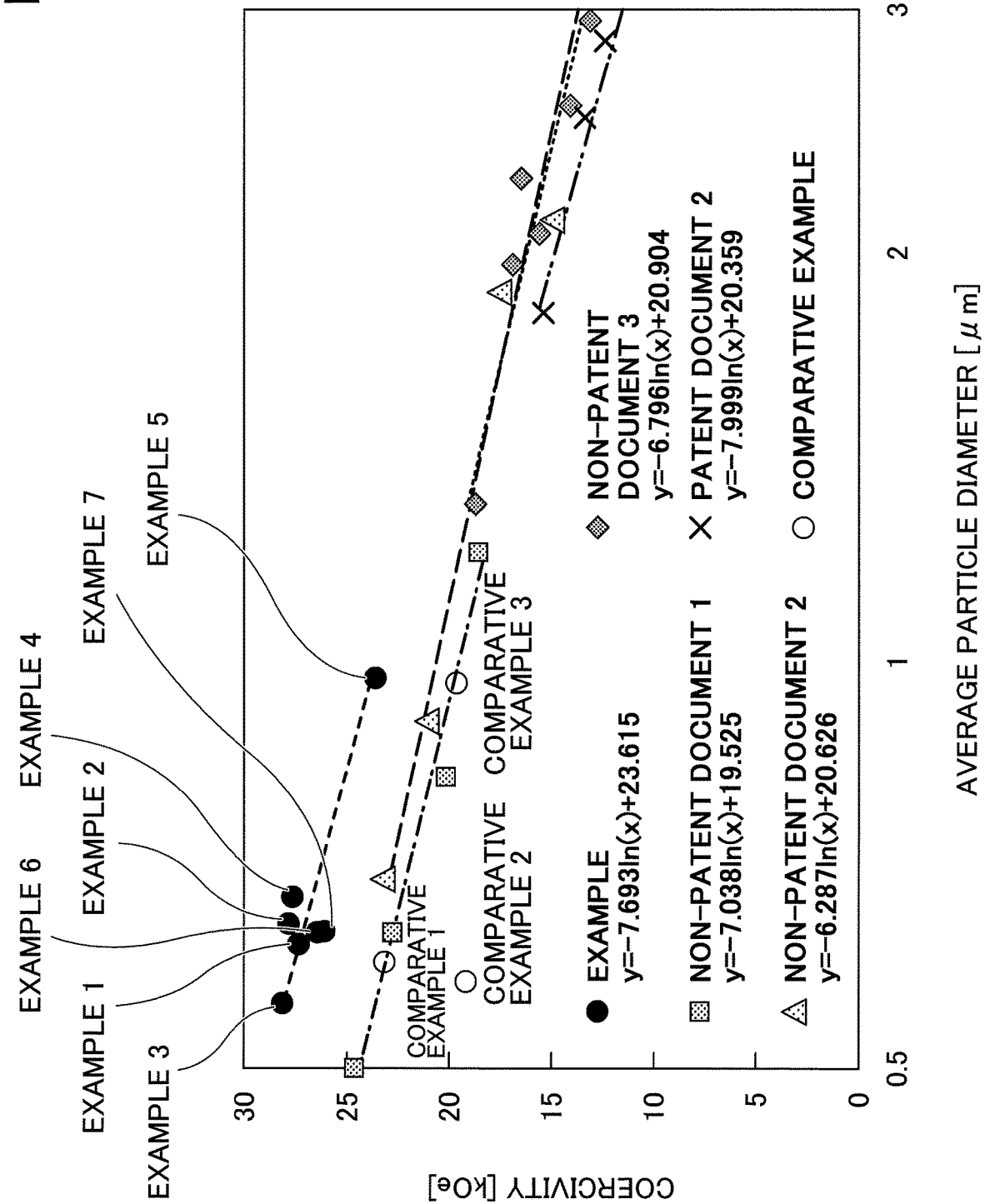

SAMARIUM-IRON-NITROGEN MAGNET POWDER AND METHOD FOR MANUFACTURING SAME

TECHNICAL FIELD

The present disclosure relates to a samarium-iron-nitrogen magnet powder and a method for manufacturing a samarium-iron-nitrogen magnet powder.

BACKGROUND ART

Currently, neodymium-iron-boron magnets are used in a variety of applications as high performance magnets.

However, because the neodymium-iron-boron magnets have a low Curie temperature of 312° C. and a low heat resistance, dysprosium must be added to be used in environments exposed to high temperatures, such as motors. There are supply concerns here because of the low production of dysprosium and its limited production regions.

Therefore, a samarium-iron-nitrogen magnet has been developed as a high-performance magnet without dysprosium and with a high heat resistance.

The samarium-iron-nitrogen magnet has saturation magnetization equivalent to that of the neodymium-iron-boron magnet, and the Curie temperature is as high as 477° C. The temperature change of the magnet property is small, and the anisotropic magnetic field, which is considered to be the theoretical coercivity value, is 260 kOe, which is a very high value about three times as high as the neodymium-iron-boron magnet. Therefore, samarium-iron-nitrogen magnet is expected to be highly heat resistant magnet (see, for example, Patent Documents 1 to 4 and Non-Patent Documents 1 to 3).

Methods for manufacturing samarium-iron-nitrogen magnet powder include a method in which the samarium-iron oxide powder produced by a coprecipitation method is reduced with hydrogen, reduced and diffused with calcium to form a samarium-iron alloy powder, which is then nitrided, and then unreacted calcium and calcium oxide, which is a by-product, are washed off. In this method, fine samarium-iron-nitrogen magnet powders can be produced without being crushed. Thus, the samarium-iron-nitrogen magnet powder having a high coercivity can be manufactured because distortions in the samarium-iron-nitrogen magnet powder and edges that can be the reverse magnetic domain are few.

PRIOR ART DOCUMENTS

Patent Documents

Patent Document 1: Japanese Patent Application Publication No. 10-60505
Patent Document 2: Japanese Patent Application Publication No. 2007-270303
Patent Document 3: Japanese Patent Application Publication No. 2004-31761
Patent Document 4: Japanese Patent Application Publication No. 2003-7521

Non-Patent Documents

Non-Patent Document 1: Journal of Alloys and Compounds 695 (2017) 1617-1623
Non-Patent Document 2: Scripta Materialia 120 (2016) 27-30
Non-Patent Document 3: Proceedings of the 22th International Workshop on Rare-Earth Permanent Magnets and their Applications (2012) 48-53

SUMMARY OF THE INVENTION

Problem to be Solved by the Invention

However, because a currently commercially available samarium-iron-nitrogen magnet powder has a coercivity of about 15 kOe, it is difficult to use the samarium-iron-nitrogen magnet powder at a temperature exceeding 100° C. Therefore, a samarium-iron-nitrogen magnet powder with a high coercivity is demanded.

One embodiment of the present invention is intended to provide a samarium-iron-nitrogen magnet powder having a high coercivity.

Means for Solving the Problem

One aspect of the present invention is that in a samarium-iron-nitrogen magnet powder, a non-magnetic phase is formed on a surface of the samarium-iron-nitrogen magnet phase, wherein an arithmetic mean roughness Ra is 3.5 nm or less.

Another aspect of the invention includes, in a method for manufacturing a samarium-iron-nitrogen magnet powder, a step of producing a samarium-iron alloy powder by reducing and diffusing a precursor powder of a samarium-iron alloy, a step of nitriding the samarium-iron alloy powder, a step of demagnetizing a samarium rich phase present on a surface of the nitrided samarium-iron alloy powder, a step of cleaning the powder in which the samarium rich phase is demagnetized with a solvent capable of dissolving a calcium compound, and a step of dehydrogenating the cleaned powder.

Advantageous Effect of the Invention

According to an aspect of the present invention, a samarium-iron-nitrogen magnet powder having a high coercivity can be provided.

BRIEF DESCRIPTION OF THE DRAWINGS

FIG. 13 is a graph showing a relationship between an average particle size and coercivity of a samarium-iron-nitrogen magnet powder.

EMBODIMENTS FOR CARRYING OUT THE INVENTION

Figure 1:
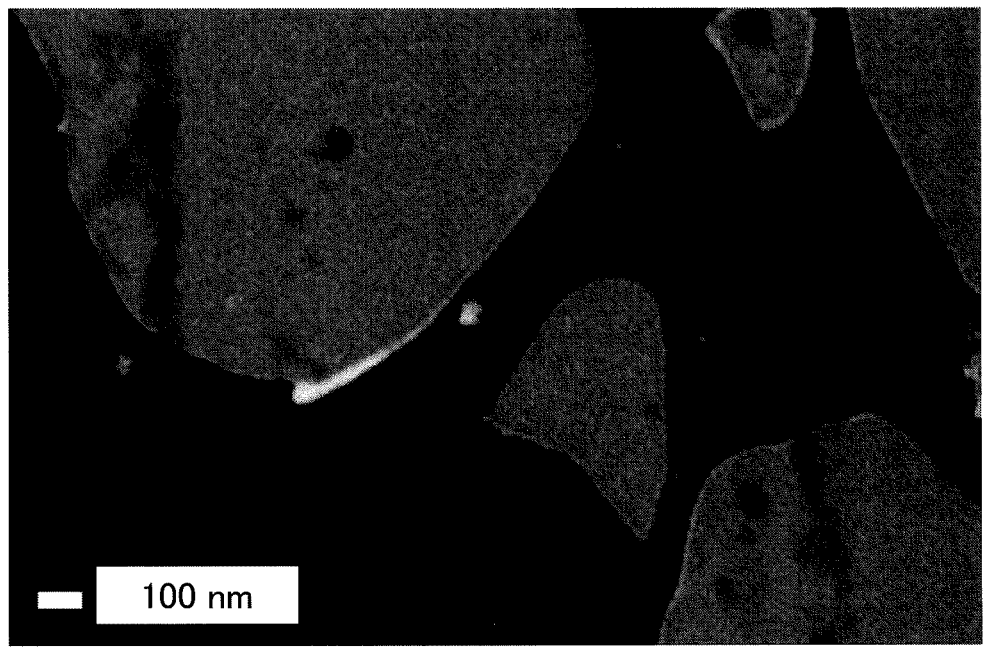
FIG. 1 is an FE-SEM backscattered electron image of a cross section of a samarium-iron-nitrogen magnet powder of Example 1.

The present inventors have found that the presence or absence of a layer formed on a surface of a samarium-iron-nitrogen magnet phase influences surface smoothness of the samarium-iron-nitrogen magnet powder while examining a fabrication of a high-performance samarium-iron-nitrogen magnet powder. The inventors have also found that the surface smoothness of the samarium-iron-nitrogen magnet powder significantly influences a coercivity of the samarium-iron-nitrogen magnet powder. Furthermore, the present inventors have found that forming the non-magnetic phase on the surface of the samarium-iron-nitrogen magnet phase increases the coercivity of the samarium-iron-nitrogen magnet powder, and thus arrived at the present invention.

In order to increase the coercivity of the magnet powder, it is widely known that a size and surface conditions of the magnet powder are important in addition to the crystal structure of the magnet powder. In particular, when a defect, such as irregularities, distortions or the like, is present on the surface of the magnetic powder, the coercivity of the magnetic powder decreases because the anisotropic magnetic field of the defect portion decreases. Therefore, the surface of the magnet powder preferably has a smooth surface with scarce defects.

In the present embodiment, pre-reduction, reduction-diffusion, nitriding, cleaning, and dehydrogenation are performed on the samarium-iron oxide powder and/or the samarium-iron hydroxide powder produced by a wet synthesis method to produce the samarium-iron-nitrogen magnet powder. Thus, a fine powder can be produced without further processing the powder such as pulverization. As a result, because there is no damage caused by the pulverization, a samarium-iron-nitrogen magnet powder having a fewer surface defect and a high coercivity can be obtained.

In particular, by setting the temperature at which the samarium oxide-iron powder is reduced and diffused at 950° C. or less, it is possible to produce a submicrometer-size samarium-iron-nitrogen magnet powder having an average particle size of less than 1 μm. The smaller the average particle size of the samarium-iron-nitrogen magnet powder, the higher the coercivity of the samarium-iron-nitrogen magnet powder. Specifically, the present inventors have produced a samarium-iron-nitrogen magnet powder with an average particle size of 0.65 μm and a coercivity of 24.7 kOe (see, for example, Non-Patent Document 1).

In order to produce a samarium-iron-nitrogen magnet powder with a higher coercivity, the inventors have investigated a factor that influences the surface coercivity of the samarium-iron-nitrogen magnet powder and have developed a method for controlling the surface.

When the samarium oxide-iron powder is reduced and diffused, samarium produced by reducing the samarium oxide is diffused to iron, and a samarium-iron alloy power is obtained. On this occasion, if an iron phase (soft magnetic phase) with a high magnetization remains, the magnet characteristics such as the coercivity, residual magnetization, and angular properties of the samarium-iron-nitrogen magnet powder are greatly reduced. Thus, although samarium is usually added in excess of the stoichiometric ratio, the excessively added samarium forms a samarium-rich phase.

Here, the samarium-rich phase is expressed by the general formula:

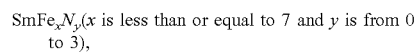

$SmFe_xN_y$ ($x$ is less than or equal to 7 and $y$ is from 0 to 3), and contains samarium more than that of a samarium-iron-nitrogen magnet phase having a crystal structure expressed by $Th_2Zn_{17}$ or $TbCu_7$, but is said to have inferior magnetic properties to those of the samarium-iron-nitrogen magnet phase. Therefore, a dissolution treatment with a weak acid, such as a dilute aqueous acetic acid solution having a pH of 5 to 7, is performed for the samarium-rich phase (see, for example, Patent Document 1).

The inventors have investigated in detail the samarium-rich phase and an impact of the samarium-rich phase on the surface of the samarium-iron-nitrogen magnet powder, and an impact of the surface of the samarium-iron-nitrogen magnet powder on the coercivity. As a result, it has been found that a $SmFe_5$ phase (soft magnetic phase) is present on the surface of the samarium-iron-nitrogen magnet phase when the samarium-iron-nitrogen magnet powder is manufactured according to the conventional manufacturing method. In addition, it has been found that when a melting process using a weak acid having a pH less than 7 is performed on the samarium-rich phase, roughness is generated on the surface of the samarium-iron-nitrogen magnet powder, and the coercivity of the samarium-iron-nitrogen magnet powder is reduced. Therefore, it has been found that when the non-magnetic phase is formed on the surface of the samarium-iron-nitrogen magnet phase by demagnetizing the samarium-rich phase, an arithmetic mean roughness Ra is 3.5 nm or less, and a samarium-iron-nitrogen magnet powder having a high coercivity is obtained.

Hereinafter, the samarium-iron-nitrogen magnet powder and the method for manufacturing the same will be described in detail. Overlapping explanations will be omitted as appropriate. In addition, when a numeric range is indicated with "-" between two values, these two values are also included in the numeric range.

Samarium-Iron-Nitrogen Magnet Powder

The samarium-iron-nitrogen magnet powder in the present embodiment has a non-magnetic phase formed on the surface of the samarium-iron-nitrogen magnet phase. That is, the samarium-iron-nitrogen magnet powder in the present embodiment has a core-shell structure, and a non-magnetic phase (shell) is formed on at least a part of the surface of the samarium-iron-nitrogen magnet phase (core).

Incidentally, the samarium-iron-nitrogen magnet powder according to the present embodiment does not substantially have a $SmFe_5$ phase formed on a surface.

The arithmetic mean roughness Ra of the samarium-iron-nitrogen magnet powder according to the present embodiment is 3.5 nm or less, preferably 2 nm or less, and more preferably 1 nm or less.

Here, when the non-magnetic phase is not formed on the surface of the samarium-iron-nitrogen magnet phase, because the samarium-iron-nitrogen magnet powder has irregularities on its surface due to oxidation and the like, the arithmetic mean roughness Ra exceeds 3.5 nm, and the coercivity of the samarium-iron-nitrogen magnet powder decreases.

On the other hand, when the non-magnetic phase is formed on the surface of the samarium-iron-nitrogen magnet phase, the surface smoothness of the samarium-iron-nitrogen magnet phase is maintained regardless of the thickness of the non-magnetic phase. Thus, the thickness of the non-magnetic phase has no particular effect on the coercivity of the samarium-iron-nitrogen magnet powder. Here, the non-magnetic phase is preferably thin because the magnetization of the samarium-iron-nitrogen magnet powder decreases when the non-magnetic phase is thick.

The arithmetic mean roughness Ra of samarium-iron-nitrogen magnet powder can be measured using a transmission electron microscope (TEM) or a scanning transmission electron microscope (STEM).

When the plane for measuring the arithmetic mean roughness Ra (hereinafter referred to as the measurement plane) is a cross section, the arithmetic mean roughness Ra may be determined based on the definition of the arithmetic mean roughness Ra of JIS B0601.

Specifically, the mean line (waviness curve) is obtained from the cross-sectional curve of the measuring plane, and the mean line is subtracted from the cross-sectional curve. In other words, the mean line is replaced with a straight line to obtain the roughness curve. Then, according to the coordinate system defined in JIS B0601, the direction coinciding with the mean line replaced by the straight line is made an X-axis, and the direction perpendicular to the X-axis and parallel to the cross section is made a Z-axis. Only the reference length l is drawn from the roughness curve in the direction of the X-axis, and the mean line in this drawn part can be shown by the following formula (1).

[Formula 1]

$$Z_0 = \frac{1}{l}\int_0^l Z(x)dx \qquad \text{FORMULA (1)}$$

On this occasion, the arithmetic mean roughness Ra is the average of the absolute values of the deviation between $Z(x)$ and $Z_0$, and can be determined by the following formula (2).

[Formula 2]

$$Ra = \frac{1}{l}\int_0^l |Z(x) - Z_0|dx \qquad \text{FORMULA (2)}$$

Specifically, for example, a measuring plane is observed at a cross section using a microscope that can observe the plane at a high magnification such as a TEM, and a mean line and a roughness curve are obtained from a cross-sectional curve. Any 150 nm square region is selected on the X-axis, and 50 X values (X1 to X50) are taken at regular intervals within the selected region, and the Z values (Z(x1) to Z(x50)) corresponding to the respective X values are measured. From the measured Z values, $Z_0$ can be obtained by the following formula (3).

$$Z_0=(1/50)*\{Z(x_1)+Z(x_2)+Z(x_3)+\ldots+Z(x_{50})\} \qquad \text{FORMULA (3)}$$

The arithmetic mean roughness Ra can be obtained using the obtained $Z_0$, by the following formula (4).

$$Ra=(1/50)*\{|Z(x_1)-Z_0|+|Z(x_2)-Z_0|+\ldots+||Z(x_{50})-Z_0|\} \qquad \text{FORMULA (4)}$$

The coercivity of a samarium-iron-nitrogen magnet powder relates to the surface smoothness of the samarium-iron-nitrogen magnet powder. Therefore, the non-magnetic phase may be formed on at least a part of the surface of the samarium-iron-nitrogen magnet phase.

The coverage of the samarium-iron-nitrogen magnet powder in the non-magnetic phase is preferably 50% or more, more preferably 60% or more, and even more preferably 80% or more in terms of the coercivity of the samarium-iron-nitrogen magnet powder.

Here, when a soft magnetic phase, such as an iron phase and a $SmFe_5$ phase, is formed on the surface of the samarium-iron-nitrogen magnet phase instead of the non-magnetic phase, the coercivity of the samarium-iron-nitrogen magnet powder decreases.

The non-magnetic phase is a phase obtained by demagnetizing a samarium rich phase, and is lower in magnetization than that of the $SmFe_5$ phase. The lower the magnetization, the more preferable the non-magnetic phase.

As used in the specification and the claims, the samarium-iron-nitrogen magnet means a magnet containing samarium, iron, and nitrogen.

The elemental composition of the non-magnetic phase and the crystalline phase are not particularly limited, but preferably the non-magnetic phase is a samarium oxide phase.

When the average particle size and the coercivity of the samarium-iron-nitrogen magnet powder in the present embodiment are made X [μm] and Y [kOe], respectively, the following formula is preferably satisfied.

$$Y=a*ln(X)+b$$

(a is from −9 to −6, and b is 22 or more in the formula)

Thus, the coercivity of the samarium-iron-nitrogen magnet powder can be made high.

In the X-ray diffraction pattern of the samarium-iron-nitrogen magnet powder in the present embodiment, when the intensity of the peak derived from the $Sm_2Fe_{17}N_3$ phase is made c, and the intensity of the peak derived from the $SmFe_5$ phase is made d, the following formula is preferably satisfied.

$$d/c<0.05$$

Thus, the coercivity of the samarium-iron-nitrogen magnet powder can be made high.

In the X-ray diffraction pattern of the samarium-iron-nitrogen magnet powder in the present embodiment, when the intensity of the peak derived from the $Sm_2Fe_{17}N_3$ phase is made c, and the intensity of the peak derived from the $Sm_2O_3$ phase is made e, the following formula is preferably satisfied.

$$e/c \geq 0.05$$

Thus, the coercivity of the samarium-iron-nitrogen magnet powder can be made high.

The samarium-iron-nitrogen magnet powder of the present embodiment may further include rare earth elements such as neodymium, praseodymium, and iron group elements other than iron. The crystal structure of the samarium-iron-nitrogen magnet may be either of the $Th_2Zn_{17}$ structure or the $TbCu_7$ structure.

Method for Manufacturing Samarium-Iron-Nitrogen Magnet Powder

A process for manufacturing a samarium-iron-nitrogen magnet powder includes steps of making a samarium-iron alloy powder by reducing and diffusing a precursor powder of the samarium-iron alloy, nitriding the samarium-iron alloy powder, and demagnetizing a samarium-rich phase present on the surface of the nitrided samarium-iron alloy powder. The method for manufacturing the samarium-iron-nitrogen magnet powder also includes steps of cleaning the demagnetized powder of the samarium-rich phase with a solvent capable of dissolving a calcium compound, and dehydrogenating the cleaned powder. Thus, a fine and high coercive samarium-iron-nitrogen magnet powder can be manufactured without being crushed.

Manufacture of Precursor Powder of Samarium-Iron Alloy

The precursor powder of a samarium-iron alloy is not particularly limited if it is possible to manufacture the samarium-iron alloy powder by being reduced and diffused. The samarium-iron oxide powder and/or the samarium-iron hydroxide powder and the like are cited as the precursor powder of the samarium-iron alloy, and two or more kinds of the powders may be used together.

In the present specification and claims, the term of the samarium-iron alloy powder means an alloy powder containing samarium and iron.

The samarium-iron alloy powder may further include a rare earth element such as neodymium and praseodymium, and an iron group element other than iron.

The precursor powder of the samarium-iron alloy can be produced by a coprecipitation method. Specifically, a precipitate composed of a compound of samarium and iron (mainly hydroxide) is precipitated by adding a precipitating agent such as an alkali to a solution containing a samarium salt and an iron salt, and the precipitate is collected by filtration, centrifugation, and the like. The precipitate is then washed and dried in a hot air oven to obtain a samarium-iron hydroxide and/or oxide. Further, the samarium-iron oxide powder and/or the samarium-iron hydroxide powder are produced by roughly crushing samarium-iron hydroxide and/or oxide with a blade mill and the like, and then finely crushing the samarium-iron hydroxide and/or oxide with a bead mill and the like.

The counter ions of the samarium salt and the iron salt may be inorganic ions such as chloride ions, sulfate ions, nitrate ions, or organic ions such as alkoxide.

As the solvent contained in the solution containing the samarium salt and the iron salt, an organic solvent, such as water or ethanol, may be used.

As the alkali, for example, a hydroxide of an alkali metal and an alkaline earth metal, or ammonia can be used.

In addition, a compound such as urea that decomposes and forms an alkali by external action such as heat may be used as a precipitating agent instead of the alkali.

Alternatively, drying in a vacuum may be performed for the precipitation instead of drying the precipitation in a hot air oven.

An iron-samarium hydroxide and/or oxide powder produced by adding the samarium salt to a suspension containing iron hydroxide particles or iron oxide particles, and then evaporating and drying the suspension, or adding a precipitating agent to the suspension, may be used as a precursor powder of the samarium-iron alloys other than the samarium-iron oxide powder and/or the samarium-iron hydroxide powder.

In addition, an iron-samarium hydroxide and/or oxide powder produced by adding an iron salt to a suspension containing the samarium compound particles with controlled particle size, and then evaporating and drying the suspension, or adding a precipitating agent to the suspension, may be used as a precursor powder of the samarium-iron alloy.

Reduction-Diffusion

The reduction-diffusion method of the precursor powder of the samarium-iron alloy includes, but is not particularly limited to, a method of heating the precursor powder of the samarium-iron alloy in an inert gas atmosphere to a temperature exceeding the melting point of calcium (about 850° C.) while using calcium or calcium hydride. In this case, samarium reduced by calcium diffuses into the calcium melt and reacts with iron, thereby producing the samarium-iron alloy powder.

There is a correlation between the reduction-diffusion temperature and the particle size of the samarium-iron alloy powder, and the higher the reduction-diffusion temperature, the greater the particle size of the samarium-iron alloy powder.

For example, in order to obtain the $Sm_2Fe_{17}$ powder having an average particle size of 1 μm or less, the reduction-diffusion is performed at 850° C. to 950° C. for 30 minutes to 2 hours under an inert gas atmosphere.

Pre-Reduction

When the precursor powder of the samarium-iron alloy contains iron oxide or an iron compound, the precursor powder is preferably pre-reduced into iron prior to the reduction-diffusion. This reduces the particle size of the samarium-iron alloy powder.

The method of pre-reducing the precursor powder of the samarium-iron alloy is not limited to a specific method, but includes a method of heating the precursor powder at a temperature of 400° C. or higher in a reducing atmosphere such as hydrogen and the like.

For example, in order to obtain a compound powder made of iron, a samarium-iron oxide, and a samarium oxide having an average particle diameter of 1 μm or less using a heat treatment furnace, a pre-reduction is performed at a temperature of 500° C. to 800° C. in a hydrogen atmosphere.

Nitriding

Examples of the method of nitriding the samarium-iron alloy powder include, but are not limited to, a method of heating the powder at 300° C. to 500° C. in an atmosphere of ammonia, a gas mixture of ammonia and hydrogen, nitrogen, a gas mixture of nitrogen and hydrogen, and the like.

The nitrogen content in the samarium-iron-nitrogen magnet phase influences the magnet properties of the samarium-iron-nitrogen magnet powder. It is known that the best samarium-iron-nitrogen magnet phase for increasing the magnetic coercivity of the samarium-iron-nitrogen magnet powder is a $Sm_2Fe_{17}N_3$ phase. Therefore, it is important to control the nitrogen content in the samarium-iron-nitrogen magnet phase. When the samarium-iron alloy powder is nitrided using ammonia, it is possible to nitride the samarium-iron alloy powder in a short period of time, but the nitrogen content in the samarium-iron-nitrogen magnet phase may be greater than that of the $Sm_2Fe_{17}N_3$ phase. In this case, it is known that excessive nitrogen can be discharged from the crystal lattice by nitriding the samarium-iron alloy powder and then annealing the nitride samarium-iron alloy powder in hydrogen. Therefore, in order to form the single-phase $Sm_2Fe_{17}N_3$ phase in a short period of time, a method of nitriding the samarium-iron alloy powder using ammonia is preferable.

For example, to begin with, the nitrogen content in the samarium-iron-nitrogen magnet phase is optimized by nitriding the samarium-iron alloy powder in a mixed stream atmosphere of ammonia and hydrogen at 350° C. to 450° C. for 10 minutes to 2 hours, and then switching in a hydrogen stream atmosphere at the same temperature, and annealing the samarium-iron alloy powder for 30 minutes to 2 hours. The hydrogen is then removed by switching the atmosphere to an argon stream while heating the samarium-iron alloy powder at the same temperature for 0 to 1 hour.

Demagnetization of Samarium-Rich Phase

The surface of the nitrided samarium-iron alloy powder has a samarium-rich phase. When cleaning, drying in a vacuum, and dehydrogenation are performed on the nitrided samarium-iron alloy powder similar to the conventional way, the $SmFe_5$ phase is formed on the surface of the samarium-iron-nitrogen magnet phase, and the coercivity of the samarium-iron-nitrogen magnet powder decreases. Therefore, prior to cleaning the nitrided samarium-iron alloy powder, for example, the samarium-rich phase is exposed to an oxidizing atmosphere, and is slowly oxidized. Thus, the samarium oxide phase is formed on the surface of the samarium-iron-nitrogen magnet phase, thereby producing the samarium-iron-nitrogen magnet powder with a high coercivity.

The oxidizing atmosphere is not limited to a specific atmosphere, but an inert gas atmosphere containing moisture or an inert gas atmosphere containing a trace amount of oxygen can be used.

Instead of slowly oxidizing the samarium-rich phase, elements capable of demagnetizing the samarium-rich phase may be added to the surface of the nitrided samarium-iron alloy powder by a wet process such as an impregnating method or a dry process such as a sputtering method, and then may be heated.

Cleaning

The powder in which the samarium-rich phase is demagnetized includes a calcium compound such as a calcium oxide, unreacted metal calcium, a calcium nitride in which the metal calcium is nitrided, a calcium hydride, and the like. Therefore, in order to produce the samarium-iron-nitrogen magnet powder, the powder, in which the samarium-rich phase is demagnetized, is preferably washed with a solvent capable of dissolving the calcium compound to remove the calcium compound. Thus, the magnetization of the samarium-iron-nitrogen magnet powder can be increased.

Examples of the solvent capable of dissolving the calcium compound include, but are not limited to, water, alcohol, and the like. Among these, water is preferred because of its cost and good solubility of the calcium compound.

For example, at first, most of the calcium compounds can be removed by adding a demagnetized powder of the samarium-rich phase to water and repeating the stirring and decantation. The residual calcium compound can then be removed by adding water to the powder in which most of the calcium compound has been removed, adding dilute aqueous acetic acid while stirring the powder, and adjusting the pH to 7.

Drying in Vacuum

The cleaned powder is preferably dried in a vacuum to remove a solvent capable of dissolving the calcium compound.

The temperature at which the cleaned powder is dried in a vacuum is between room temperature and 100° C. This can reduce the oxidation of the cleaned powder.

The cleaned powder may be replaced with an organic solvent that is highly volatile such as an alcohol and can mix with water, and then dried in a vacuum.

Dehydrogenation

When the samarium-iron alloy obtained by demagnetizing the samarium-rich phase is cleaned, the cleaned powder is dehydrogenated in order to remove the hydrogen that has invaded into the crystalline lattice. Thus, the coercivity of the samarium-iron-nitrogen magnet powder can be made high.

A method of dehydrogenating the cleaned powder includes, but is not limited to, a method of heating the cleaned powder in a vacuum or an inert gas atmosphere.

EXAMPLES

Hereinafter, examples of the present invention will be described, but the present invention is not limited to the examples.

[Production of Samarium-Iron Oxide Powder]

The 65 g of iron nitrate enneahydrate of and 13 g of samarium nitrate were dissolved in 800 ml of water; 120 ml of 2 mol/L potassium hydroxide solution was delivered by drops while stirring the water; and the water was stirred at room temperature overnight to obtain a suspension. The suspension was collected by filtration, washed and dried overnight in a hot air drying oven at 120° C. in air to obtain a sample. The obtained sample was roughly crushed with a blade mill and finely crushed in ethanol with a rotating mill using a stainless steel ball. Then, after centrifugation, the crushed sample was dried in a vacuum to produce a samarium-iron oxide powder. The samarium-iron oxide powder was an amorphous oxide from the X-ray diffraction pattern.

Example 1

The following steps were performed in a glove box without being exposed to air.

The samarium-iron oxide powder was pre-reduced at 700° C. in a hydrogen gas stream for 6 hours, and an iron and samarium-iron oxide mixed powder was obtained.

The 5 g of an iron and samarium-iron oxide mixed powder and 2.5 g of calcium metal were placed in an iron crucible, and reduced and diffused at 900° C. in an argon atmosphere for 1 hour, thereby obtaining a samarium-iron alloy powder.

After the samarium-iron alloy powder was cooled to room temperature, the argon atmosphere was replaced by a hydrogen atmosphere, and the temperature was raised to 380° C. The atmosphere was changed to an atmosphere in an ammonia-hydrogen mixed stream of a 1:2 ammonia-hydrogen volume ratio, and heated to 420° C. while keeping the temperature for 1 hour, thereby nitriding the samarium-iron alloy powder. Furthermore, the nitrogen content of the nitrided samarium-iron alloy powder was optimized by switching the mixed stream to a hydrogen stream, and annealing the powder at 420° C. for 1 hour. The hydrogen was then removed by switching the stream to an argon stream and annealing the powder at 420° C. for 0.5 hours.

After the nitrogen-optimized powder was slowly oxidized in an inert gas atmosphere containing 10 vol % of air, the powder was put in air and held there overnight, thereby oxidizing and demagnetizing the samarium-rich phase.

The powder in which the samarium-rich phase was demagnetized was returned to the glovebox and washed with pure water.

The water remaining in the washed powder was replaced with 2-propanol and then dried in a vacuum at ambient temperature.

The dried powder was dehydrogenated in a vacuum at 200° C. for 3 hours, and produced a samarium-iron-nitrogen magnet powder.

Example 2

A samarium-iron-nitrogen magnet powder was produced in the same manner as Example 1, except that a dilute aqueous acetic acid solution was added to set a pH at 7 and the state was held for 15 minutes after the powder in which the samarium-rich phase was demagnetized was washed with pure water.

Example 3

A samarium-iron-nitrogen magnet powder was produced in the same manner as Example 1, except that, when the samarium-rich phase was demagnetized, the powder with the optimized nitrogen content was oxidized by being exposed to an argon atmosphere containing moisture overnight. Here, the argon containing moisture was produced by aerating argon into water.

Example 4

A samarium-iron-nitrogen magnet powder was produced in the same manner as Example 1 except that, when the samarium-rich phase was demagnetized, the powder with the optimized nitrogen content was oxidized by being exposed to an argon atmosphere containing 1 vol % of oxygen overnight.

Example 5

A samarium-iron-nitrogen magnet powder was produced in the same manner as Example 1, except that the temperature at which the samarium oxide-iron powder was reduced and diffused was changed to 950° C. The samarium-iron-nitrogen magnet powder had an average particle size of 0.97 μm, a magnetization of 132 emu/g in a magnetic field of 90 kOe, and a coercivity of 23.7 kOe.

Example 6

A samarium-iron-nitrogen magnet powder was produced in the same manner as Example 1, except that a dilute aqueous acetic acid solution was added to set a pH at 6 and the state was held for 5 minutes after the powder in which the samarium-rich phase was demagnetized was washed with pure water.

Example 7

A samarium-iron-nitrogen magnet powder was produced in the same manner as Example 1, except that a dilute aqueous acetic acid solution was added to set a pH at 6 and the state was held for 15 minutes after the powder in which the samarium-rich phase was demagnetized was washed with pure water.

Comparative Example 1

A samarium-iron-nitrogen magnet powder was produced in the same manner as Example 1, except that the samarium-rich phase was not demagnetized.

Comparative Example 2

A samarium-iron-nitrogen magnet powder was produced in the same manner as Example 1, except that the samarium-rich phase was removed by immersing the powder with the optimized nitrogen content for 15 minutes in a dilute aqueous acetic acid solution having a pH of 5 instead of demagnetizing the samarium-rich phase.

Comparative Example 3

A samarium-iron-nitrogen magnet powder was produced in the same manner as Example 5, except that the samarium-rich phase was not demagnetized. The samarium-iron-nitrogen magnet powder had an average particle size of 0.96 μm, a magnetization of 139 emu/g in a magnetic field of 90 kOe, and a coercivity of 19.7 kOe.

Next, a method for measuring an average particle size, arithmetic mean roughness Ra, and magnet characteristics of the samarium-iron-nitrogen magnet powder is described below.

Arithmetic Mean Roughness Ra

From a STEM image of a samarium-iron-nitrogen magnet powder, a center line was drawn for the contour of the samarium-iron-nitrogen magnet powder and for the irregularities of the contour, and the lengths from the center line to the contour were measured at equal intervals of at least 50 points. The average value was determined as the arithmetic mean roughness Ra of the samarium-iron-nitrogen magnet powder.

Average Particle Size

The average particle size of the samarium-iron-nitrogen magnet powder was obtained by taking the arithmetic average after measuring 200 or more randomly selected particles from the SEM image of the samarium-iron-nitrogen magnet powder.

Magnet Characteristics

A samarium-iron-nitrogen magnet powder was mixed with thermoplastic resin and then oriented in a 20 kOe magnetic field to produce a sample. Next, a vibration sample magnetometer (VSM) was used to set the sample in the direction of easy magnetization at a temperature of 27° C. and a maximum applied magnetic field of 90 kOe, and the magnet characteristics (magnetization and coercivity) of the samarium-iron-nitrogen magnet powder were measured.

Next, the surface structure of the samarium-iron-nitrogen magnet powder was then observed.

Surface Structure

A samarium-iron-nitrogen magnet powder was mixed with epoxy resin, solidified and polished, and a cross section for observation was produced using a focused ion beam (FIB). The surface structure of the samarium-iron-nitrogen magnet powder was then observed using a field emission scanning electron microscope (FE-SEM).

In addition, thin sections were fabricated using FIB, and the surface structure of the samarium-iron-nitrogen magnet powder was observed using a scanning transmission electron microscope (STEM), and the composition was analyzed in line using an energy dispersive X-ray spectroscopy (EDX).

FIGS. 1 to 4 show FE-SEM backscattered electron images of the samarium-iron-nitrogen magnet powder of Examples 1 and 2 and Comparative Examples 1 and 2.

Figure 2:
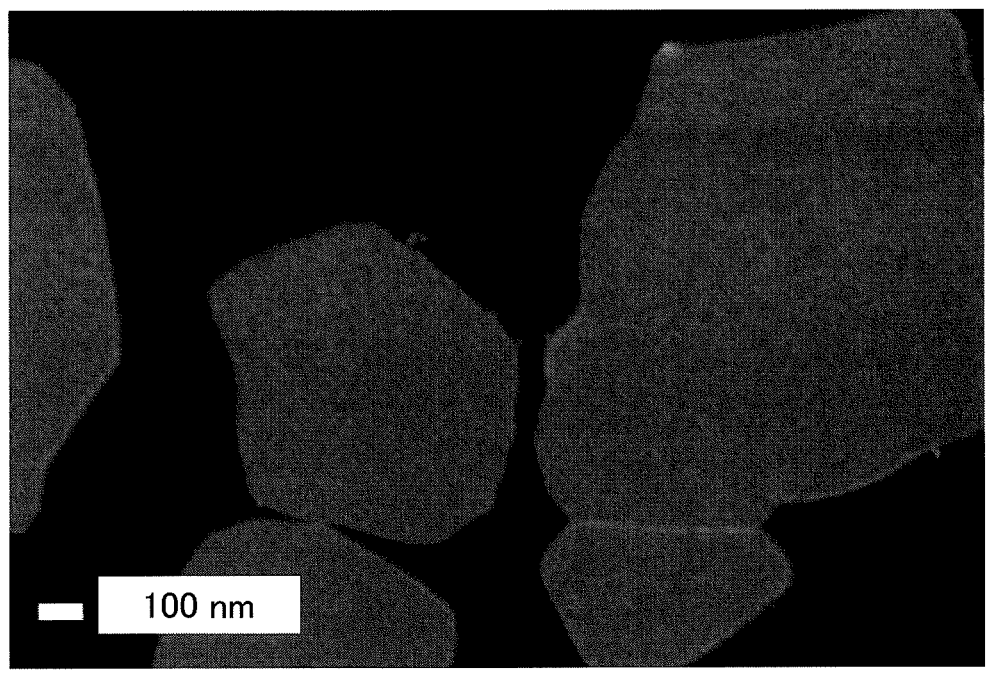
FIG. 2 is an FE-SEM backscattered electron image of a cross section of a samarium-iron-nitrogen magnet powder of Example 2.
Figure 3:
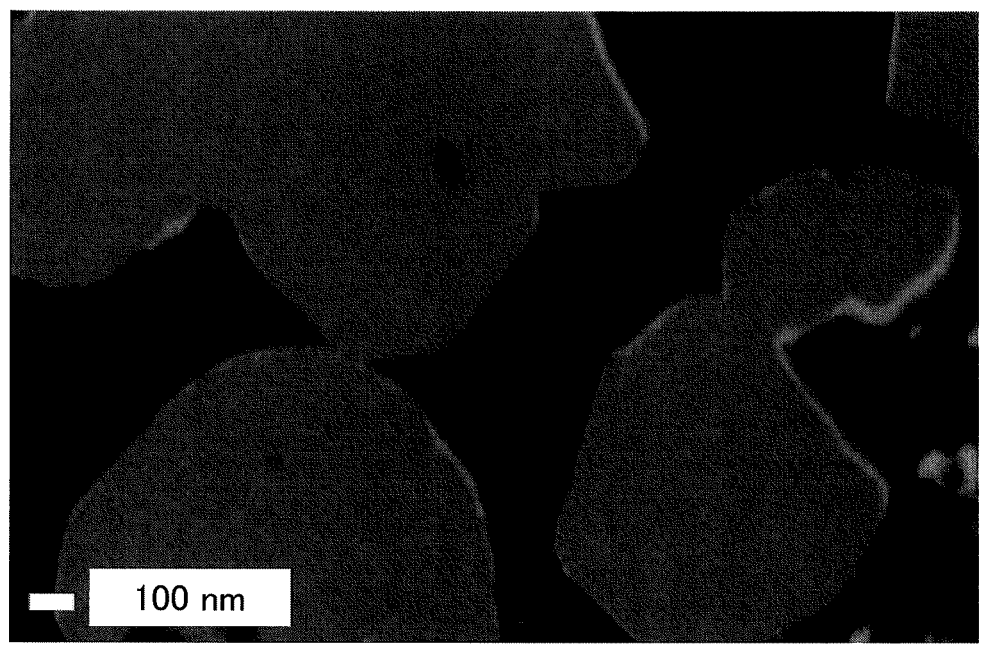
FIG. 3 is an FE-SEM backscattered electron image of a cross section of a samarium-iron-nitrogen magnet powder of Comparative Example 1.

From FIGS. 1 to 3, it is confirmed that the non-magnetic phase and the $SmFe_5$ phase of the samarium-iron-nitrogen magnet powder of Examples 1 to 2 and Comparative Examples 1 are formed on the surface with a thickness of several nm to 30 nm, respectively.

Here, because the non-magnetic phase and the $SmFe_5$ phase differ in the average atomic weight from the samarium-iron-nitrogen magnet phase, the non-magnetic phase and the $SmFe_5$ phase are observed to be whiter than the samarium-iron-nitrogen magnet phase in the FE-SEM backscattered electron image.

Figure 4:
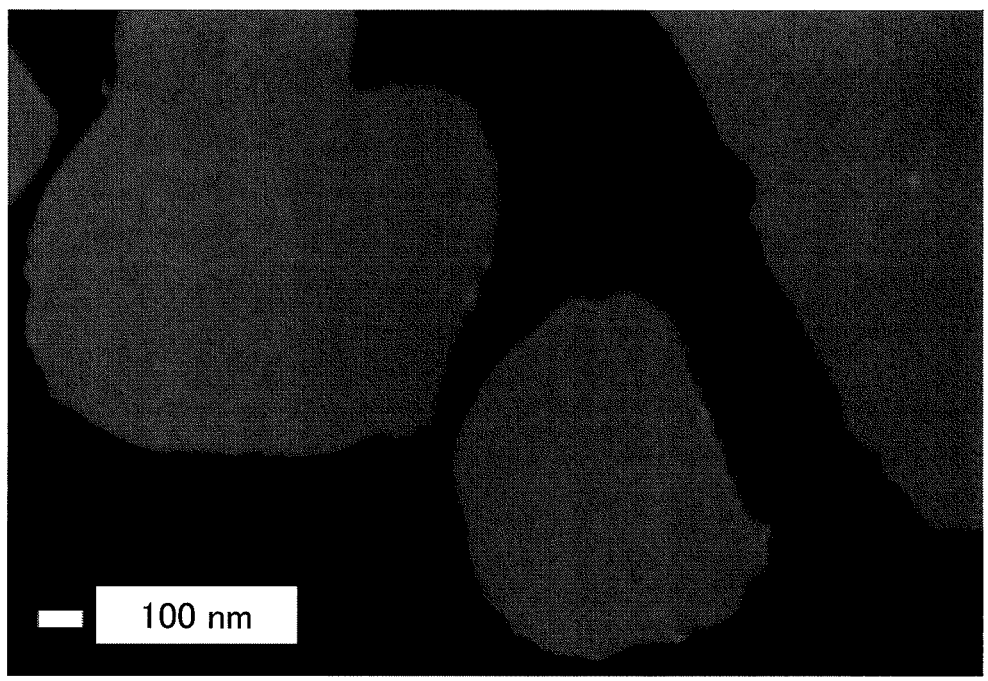
FIG. 4 is an FE-SEM backscattered electron image of a cross section of the samarium-iron-nitrogen magnet powder of Comparative Example 2.

In the meantime, from FIG. 4, it is confirmed that the $SmFe_5$ phase is not formed on the surface of the samarium-iron-nitrogen magnet powder of Comparative Example 2.

Incidentally, on the FE-SEM backscattered electron image of the cross-section of the samarium-iron-nitrogen magnet powder, any 20 particles were selected, the ratio of the surface length of the area where the non-magnetic phase (or $SmFe_5$ phase) were present to the surface length of the particles was calculated, and then the coating coefficient of the non-magnetic phase (or $SmFe_5$ phase) of the samarium-iron-nitrogen magnet powder was obtained by arithmetically averaging the ratios.

FIGS. 5 to 8 indicate STEM images and line analysis results of sections indicated by arrows of samarium-iron-nitrogen magnet powders of Examples 1 and 2 and Comparative Examples 1 and 2.

From FIGS. 5 to 8, in the samarium-iron-nitrogen magnet powder of Examples 1 and 2 and Comparative Examples 1, Sm are detected more strongly than Fe, while Sm and Fe were detected almost similarly in the samarium-iron-nitrogen magnet powder of Comparative Example 2. This indicates that the non-magnetic phase and the $SmFe_5$ phase are formed on the surfaces of the samarium-iron-nitrogen magnet powder of Examples 1 and 2 and Comparative Example 1, respectively, whereas the $SmFe_5$ phase is not formed on the surface of the samarium-iron-nitrogen magnet powder of Comparative Example 2.

Figure 5:
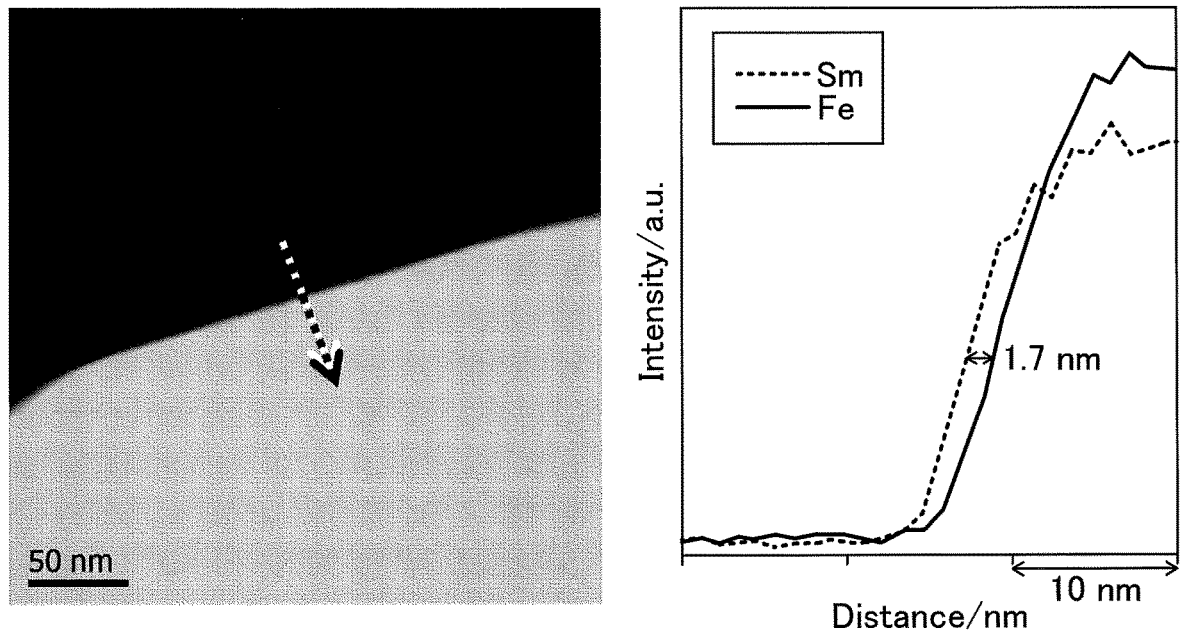
FIG. 5 is results of a STEM image and a line analysis of a cross section of a samarium-iron-nitrogen magnet powder of Example 1.
Figure 6:
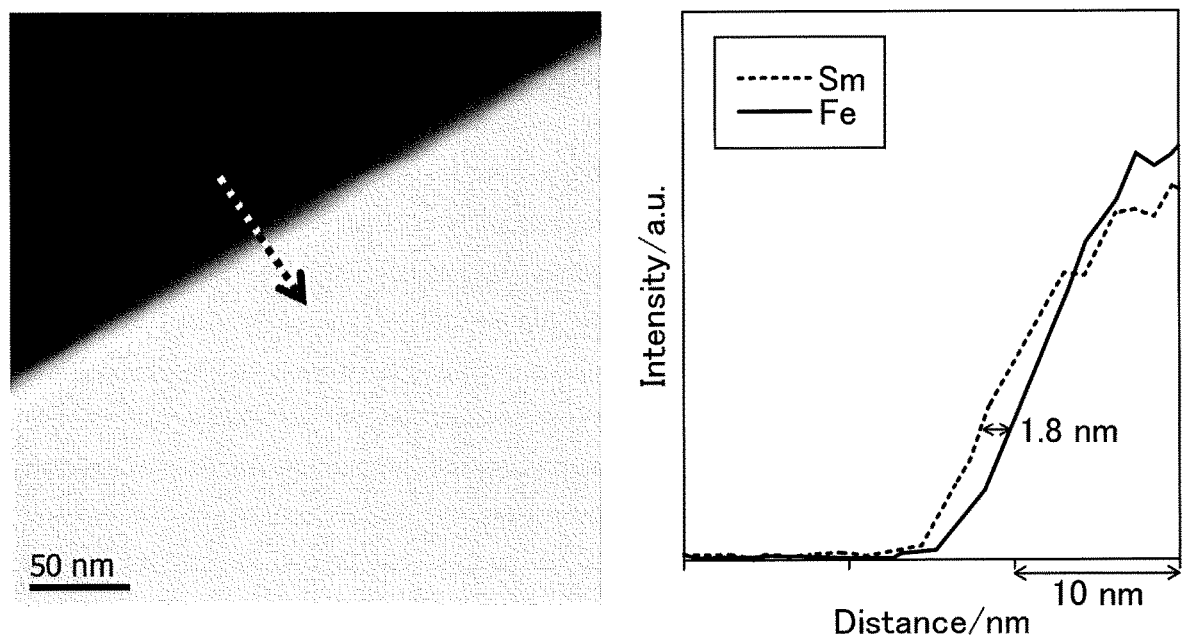
FIG. 6 is results of a STEM image and a line analysis of a cross section of a samarium-iron-nitrogen magnet powder of Example 2.
Figure 7:
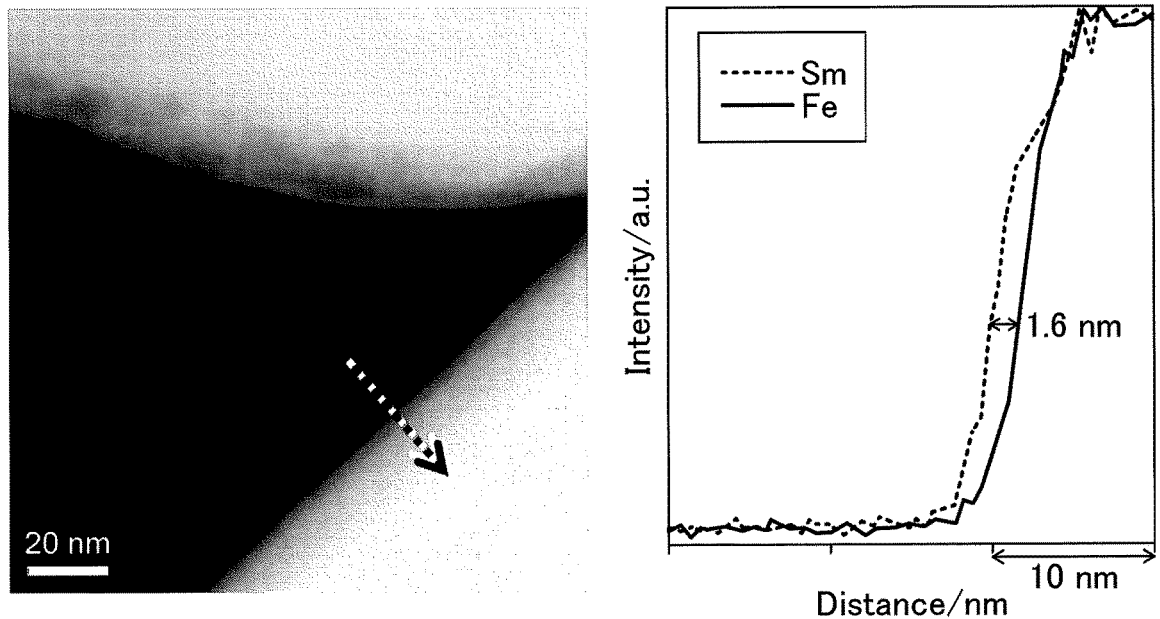
FIG. 7 is results of a STEM image and a line analysis of a cross section of a samarium-iron-nitrogen magnet powder of Comparative Example 1.

The thicknesses of the non-magnetic phase and the $SmFe_5$ phase of the samarium-iron-nitrogen magnet powder of Examples 1 and 2 and Comparative Example 1 were estimated to be 1.7 nm, 1.8 nm, and 1.6 nm, respectively, from the differences in the spectral positions of the results of the line analyses in FIGS. 5 to 7.

From the STEM images of FIGS. 5 to 7, it was confirmed that the arithmetic mean roughness Ra of the samarium-iron-nitrogen magnet powder of Examples 1 to 2 and Comparative Examples 1 was not more than 1.1 nm.

Figure 8:
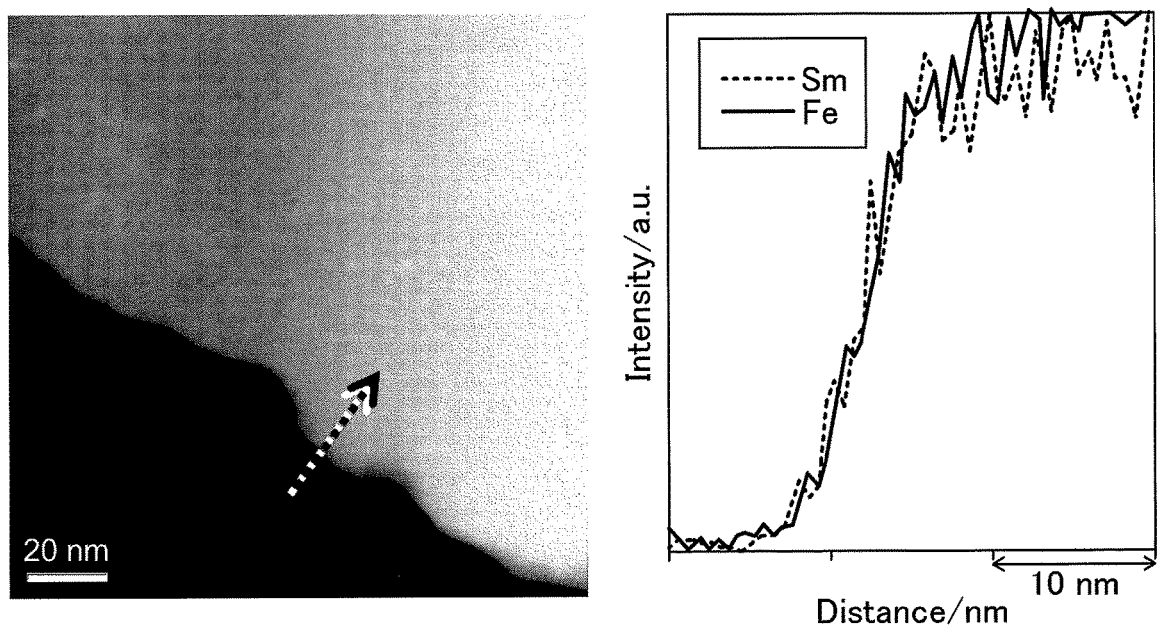
FIG. 8 is results of a STEM image and a line analysis of a cross section of a samarium-iron-nitrogen magnet powder of Comparative Example 2.

In the meantime, from the STEM image of FIG. 8, it was confirmed that the samarium-iron-nitrogen magnet powder of Comparative Example 2 had the surface irregularities formed and that the arithmetic mean roughness Ra was 3.9 nm.

The crystal structure of the samarium-iron-nitrogen magnet powder was then analyzed.

Crystal Structure

Borosilicate glass capillaries having an inner diameter of 0.3 mm were filled with samarium-iron-nitrogen magnet powder, and precise X-ray diffraction measurements were performed with a large Debye-Sheller camera using a transmission method of a synchrotron X-ray diffraction measurement of SPring-8 and beam line BL02B2 of Public Interest Incorporated Foundation, Japan Synchrotron Radiation Research Institute (JASRI). On this occasion, the wavelength of the X-ray was set at 0.4963 Å; an imaging plate was used as a detector; the exposure time was set at 10 minutes; and the measurement temperature was set at room temperature.

FIGS. 9 to 12 show X-ray diffraction patterns of the samarium-iron-nitrogen magnet powder of Examples 1 and 2 and Comparative Examples 1 and 2.

In FIGS. 9 to 12, the crystalline phases to which the respective crystalline phases belong are described, except for the peaks derived from the $Sm_2Fe_{17}N_3$ phase.

Figure 9:
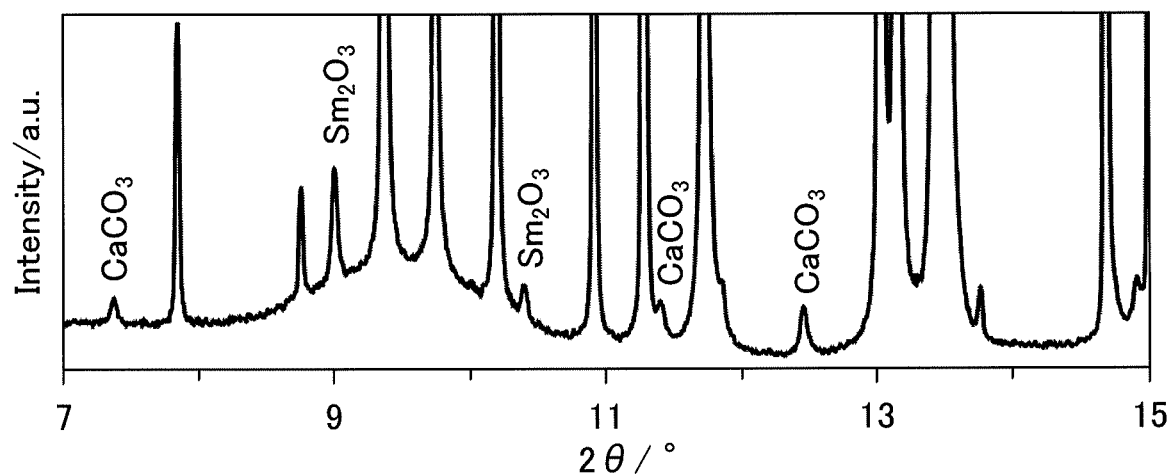
FIG. 9 is an X-ray diffraction pattern of a samarium-iron-nitrogen magnet powder of Example 1.
Figure 11:
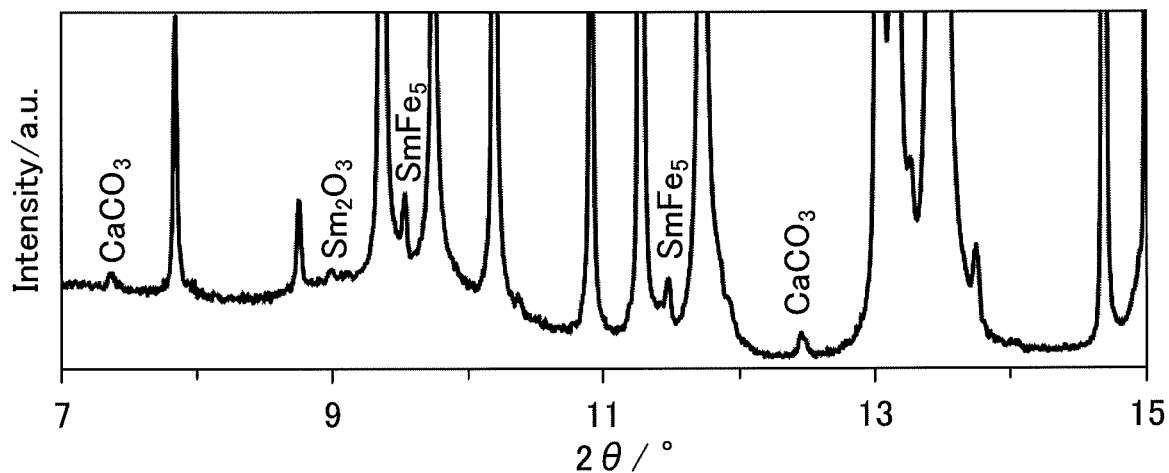
FIG. 11 is an X-ray diffraction pattern of a samarium-iron-nitrogen magnet powder of Comparative Example 1.
Figure 12:
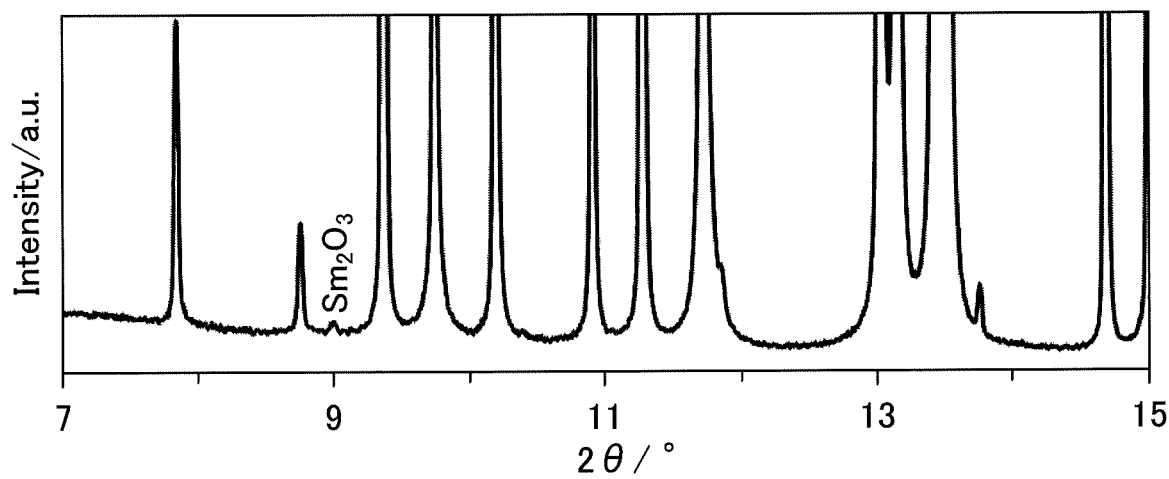
FIG. 12 is an X-ray diffraction pattern of a samarium-iron-nitrogen magnet powder of Comparative Example 2.

FIGS. 9 and 11 indicate that the $SmFe_{17}N_3$ phase, which is a soft magnetic phase, is not formed on the surface of the $Sm_2Fe_{17}N_3$ phase by demagnetizing the samarium-rich phase of the samarium-iron-nitrogen magnet powder of Example 1, but that the non-magnetic phase, the samarium oxide ($Sm_2O_3$) phase, is formed. Therefore, the coercivity of the samarium-iron-nitrogen magnet powder of Comparative Example 1 is 23.2 kOe, while the coercivity of the samarium-iron-nitrogen magnet powder of Example 1 is 27.3 kOe. This indicates that a non-magnetic phase needs to be formed on the surface of the samarium-iron-nitrogen magnet phase in order to increase the coercivity of the samarium-iron-nitrogen magnet powder.

FIG. 9 indicates that the samarium-iron-nitrogen magnet powder of Example 1 contains calcium carbonate. This may be because calcium contained in the nitrided samarium-iron alloy powder reacted with carbon dioxide in air to form a calcium carbonate that is practically insoluble in water when the samarium-rich phase is demagnetized by being exposed to air. Although calcium carbonate does not affect the coercivity of the samarium-iron-nitrogen magnet powder, it is preferable to remove the calcium carbonate because the calcium carbonate decreases the magnetization of the samarium-iron-nitrogen magnet powder.

Figure 10:
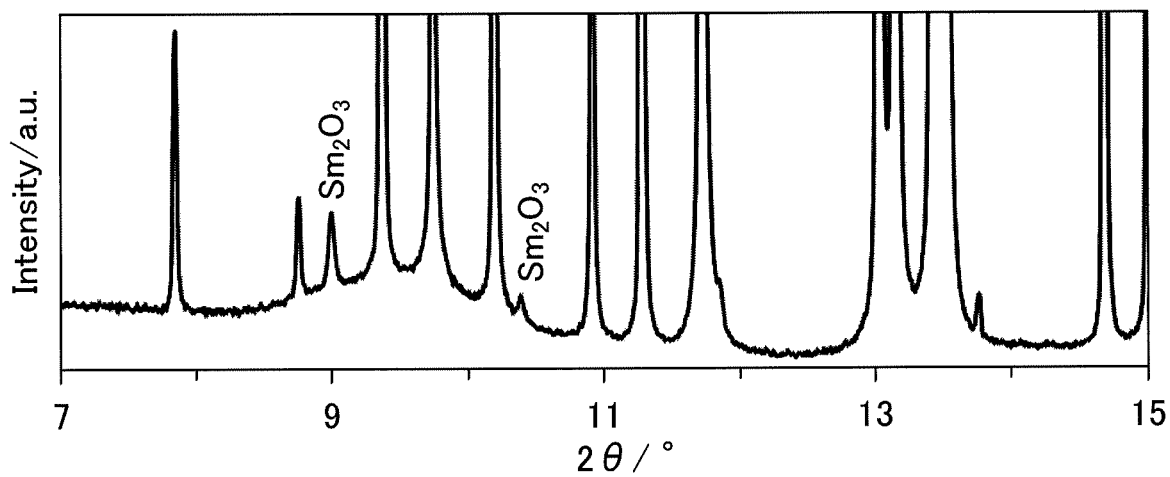
FIG. 10 is an X-ray diffraction pattern of a samarium-iron-nitrogen magnet powder of Example 2.

FIG. 10 indicates that the calcium carbonate is selectively removed from the samarium-iron-nitrogen magnet powder of Example 2 by adding a dilute aqueous acetic acid solution thereto to set a pH of 7, and that as a result, the magnetization is improved.

Table 1 shows properties of samarium-iron-nitrogen magnet powders of Examples 1-7 and Comparative Examples 1-3.

TABLE 1

| | ARITHMETIC MEAN ROUGHNESS Ra [nm] | AVERAGE PARTICLE DIAMETER [μm] | MAGNETIZATION (at 90 kOe) [emu/g] | COERCIVITY HcJ [kOe] | PEAK INTENSITY RATIO d/c | PEAK INTENSITY RATIO e/c | COATING RATIO BY NON-MAGNETIC PHASE [%] | COATING RATIO BY SmFe$_5$ [%] |
|---|---|---|---|---|---|---|---|---|
| EXAMPLE 1 | 1 OR LESS | 0.62 | 117 | 27.3 | 0.004 | 0.147 | 78 | 0 |
| EXAMPLE 2 | 1 OR LESS | 0.65 | 123 | 27.8 | 0.001 | 0.103 | 93 | 0 |
| EXAMPLE 3 | 1 OR LESS | 0.55 | 123 | 28.1 | 0.000 | 0.251 | 81 | 0 |
| EXAMPLE 4 | 1.1 | 0.66 | 122 | 27.0 | 0.000 | 0.097 | 83 | 0 |
| EXAMPLE 5 | 1.3 | 0.97 | 132 | 23.7 | 0.012 | 0.132 | 82 | 0 |
| EXAMPLE 6 | 3.0 | 0.63 | 116 | 26.5 | 0.019 | 0.078 | 68 | 0 |
| EXAMPLE 7 | 3.5 | 0.63 | 115 | 26.3 | 0.024 | 0.051 | 53 | 0 |
| COMPARATIVE EXAMPLE 1 | 1.1 | 0.60 | 124 | 23.2 | 0.089 | 0.017 | 0 | 74 |
| COMPARATIVE EXAMPLE 2 | 3.9 | 0.58 | 141 | 19.2 | 0.000 | 0.010 | 0 | 0 |
| COMPARATIVE EXAMPLE 3 | 1.4 | 0.96 | 139 | 19.7 | 0.096 | 0.006 | 0 | 81 |

Note that c, d and e are, respectively, the intensity of the peak derived from the (101) face of the Sm$_2$Fe$_{17}$N$_3$ phase at around 9.75°, the intensity of the peak derived from the (104) face of the SmFe$_5$ phase at around 9.53°, and the intensity of the peak derived from the (222) face of the Sm$_2$O$_3$ phase at around 9.02° in the X-ray diffraction pattern of the samarium-iron-nitrogen magnet powder.

Here, the intensity of the peak is a value after the background intensity is removed. The intensity of the background is obtained by measuring the X-ray diffraction pattern without filling the glass capillary used to measure the X-ray diffraction pattern with a sample under the same conditions as when measuring the X-ray diffraction pattern of the sample.

The samarium-iron-nitrogen magnet powder of Comparative Example 1 has a higher coercivity than that of the samarium-iron-nitrogen magnet powder of Comparative Example 2 because the SmFe$_5$ phase is formed on the surface. Therefore, in order to increase the coercivity of the samarium-iron-nitrogen magnet powder, the surface of the samarium-iron-nitrogen magnet powder is required to be smooth, and for this purpose, a layer needs to be formed on the surface of the samarium-iron-nitrogen magnet powder.

Here, each of the samarium-iron-nitrogen magnet powders of Comparative Examples 1 and 3 has a d/c of 0.089 to 0.096, which indicates that the SmFe$_5$ phase is formed on the surface. In contrast, each of the samarium-iron-nitrogen magnet powders of Examples 1 to 7 has a d/c of 0.000 to 0.024, which indicates that the SmFe$_5$ phase is not substantially formed on the surface.

In addition, each of the samarium-iron-nitrogen magnet powders of Examples 1 to 7 has an e/c of 0.051 to 0.251, which indicates that the Sm$_2$O$_3$ phase is formed on the surface. In contrast, each of the samarium-iron-nitrogen magnet powders of Comparative Examples 1 to 3 has an e/c of 0.006 to 0.017, which indicates that the Sm$_2$O$_3$ phase is not substantially formed on the surface.

Therefore, the samarium-iron-nitrogen magnet powder has a non-magnetic phase formed on the surface, and the smooth surface is effective in increasing the coercivity.

Table 2 shows the relationship between the atmosphere that makes the samarium-rich phase non-magnetic and the magnet characteristics of the samarium-iron-nitrogen magnet powder.

| | ATMOSPHERE FOR DEMAGNETIZING SAMARIUM-RICH PHASE | AVERAGE PARTICLE DIAMETER [μm] | CLEANING METHOD | MAGNETIZATION (at 90 kOe) [emu/g] | COERCIVITY H$_{cJ}$ [kOe] |
|---|---|---|---|---|---|
| EXAMPLE 2 | AIR | 0.65 | PURE WATER + DILUTE AQUEOUS ACETIC ACID | 123 | 27.8 |
| EXAMPLE 3 | ARGON GAS CONTAINING WATER | 0.55 | PURE WATER | 123 | 28.1 |
| EXAMPLE 4 | ARGON GAS CONTAINING 1 VOL % OF OXYGEN | 0.66 | PURE WATER | 122 | 27.6 |

In addition, because the samarium-iron-nitrogen magnet powder of Example 1 does not have the SmFe$_5$ phase on its surface but has the Sm$_2$O$_3$ phase on its surface by demagnetizing the samarium-rich phase, the coercivity is higher than that of the samarium-iron-nitrogen magnet powder of Comparative Example 1.

Furthermore, because the samarium-iron-nitrogen magnet powder of Example 5 does not have the SmFe$_5$ phase on its surface but has the Sm$_2$O$_3$ phase by demagnetizing the samarium-rich phase, the coercivity of the samarium-iron-nitrogen magnet powder of Example 5 is higher than that of the samarium-iron-nitrogen magnet powder of Comparative Examples 3.

By demagnetizing the samarium-rich phase from the samarium-iron-nitrogen magnet powder of Examples 3 and 4 in an oxidizing atmosphere without carbon dioxide, a magnet powder without calcium carbonate can be produced in the same manner as the samarium-iron-nitrogen magnet powder of Example 2, and a magnet powder with a high magnetization and a high coercivity can be obtained.

FIG. 13 shows the relationship between an average particle size and coercivity of a samarium-iron-nitrogen magnet powder.

FIG. 13 indicates that each of the samarium-iron-nitrogen magnet powders of Examples 1 to 7 has a magnetic coercivity significantly higher than that of the samarium-iron-nitrogen magnet powder of each Non-Patent Documents 1 to 3 and Patent Document 2. Here, the average particle size and coercivity of the samarium-iron-nitrogen magnet powder of Examples 1 to 7 are made X [μm] and Y [kOe], respectively, the distributions of X and Y can approximate to the following formula:

$$Y=-7.693*ln(X)+23.615$$

As shown in FIG. 13, when the coercivity of the samarium-iron-nitrogen magnet powder is plotted on the horizontal axis, and when the natural log of the average particle size of the samarium-iron-nitrogen magnet powder is plotted on the vertical axis, the slope is known to be a negative linear function. When the samarium-iron-nitrogen magnet powder having the same average particle size is compared, the higher the coercivity becomes, the more preferable the samarium-iron-nitrogen magnet powder becomes. FIG. 13 shows the relationship between the natural logarithm of the average particle diameter and the coercivity of the samarium-iron-nitrogen magnet powder of Non-Patent Documents 1 to 3 and Patent Document 2. In the following approximate formula, $$Y=a*ln(X)+b$$

a is in a range of −7.999 to −6.287, and b is in a range of 19.525 to 20.904.

In contrast, each of the samarium-iron-nitrogen magnet powders of Examples 1 to 7 achieves b=23.615 by improving surface smoothness. Furthermore, the value of a is −7.693, which is comparable to the values of samarium-iron-nitrogen magnet powders in Non-Patent Documents 1 to 3 and Patent Document 2.

Here, because the samarium-iron-nitrogen magnet powder of Patent Document 2 and Non-Patent Documents 2 and 3 do not make the samarium-rich phase non-magnetic, the $SmFe_5$ soft magnetic phase is considered to be formed on the surface as in Comparative Example 1.

In addition, because the samarium-iron-nitrogen magnet powder of Non-Patent Document 1 removes the samarium-rich phase using an aqueous acetic acid solution, it is considered that a part of the surface becomes rough and that the coercivity decreases as in Comparative Example 2.

In the meantime, examples of improving weather resistance by making the surface of the samarium-iron-nitrogen magnet powder a non-magnetic phase, are reported in Patent Documents 3 and 4.

However, in Patent Document 3, the samarium-iron-nitrogen magnet powder is oxidized after the samarium-rich phase is removed using a dilute aqueous acetic acid solution, and in Patent Document 4, a non-magnetic coating made of orthophosphate is formed on the samarium-iron-nitrogen magnet powder after crushing a coarse and large samarium-iron-nitrogen magnet powder with an attritor.

Therefore, as in Comparative Example 2, each of the samarium-iron-nitrogen magnet powders of Patent Documents 3 and 4 is expected to cause roughness on the surface, and even when a non-magnetic phase is formed on the surface, the coercivity cannot be made high. That is, when roughness occurs on the surface of the samarium-iron-nitrogen magnet powder, even if a non-magnetic phase is formed on the surface, the surface smoothness is low and coercivity cannot be made high.

Based on the above, it was confirmed that the samarium-iron-nitrogen magnet powder with high coercivity was obtained by pre-reducing the samarium-iron oxide powder, making the powder a samarium-iron alloy powder by reducing and diffusing the powder, nitriding the powder, demagnetizing the samarium-rich phase, washing off a calcium compound with water, and finally dehydrogenating the hydrogen that has invaded in the crystalline lattice during cleaning.

INDUSTRIAL APPLICABILITY

Because the samarium-iron-nitrogen magnet powder has a high Curie temperature and a small change in coercivity with respect to temperature compared to the neodymium magnet, it is possible to manufacture a magnet having both high magnetic properties and heat resistance. For example, such magnets can be mounted on household appliances such as air conditioners, production robots, automobiles, and the like, and can be used as raw materials for sintered magnets and bonded magnets used in motors, sensors, and the like that require high magnet characteristics and heat resistance.

This international application claims priority under Japanese Patent Application No. 2017-106990, filed May 30, 2017, the entire contents of which are incorporated herein by reference.

The invention claimed is:

1. A samarium-iron-nitrogen magnet powder, comprising:
   a non-magnetic phase made of a samarium oxide phase and formed on a surface of the samarium-iron-nitrogen magnet powder,
   wherein an arithmetic mean roughness Ra is 3.5 nm or less, and
   wherein an average particle size and coercivity of the samarium-iron-nitrogen magnet powder is X [μm] and Y [kOe], respectively, and the following formula is satisfied:

$$Y \geq -7.693*ln(X)+23.615.$$

2. The samarium-iron-nitrogen magnet powder as claimed in claim 1,
   wherein the following formula is satisfied:

$$Y=-7.693*ln(X)+23.615.$$

3. The samarium-iron-nitrogen magnet powder as claimed in claim 1,
   wherein an intensity of a peak derived from a $Sm_2Fe_{17}N_3$ phase is c, and an intensity of a peak derived from the $SmFe_5$ phase is d in a X-ray diffraction pattern, and
   wherein the following formula is satisfied:

$$d/c<0.05.$$

4. The samarium-iron-nitrogen magnet powder as claimed in claim 1,
   wherein an intensity of a peak derived from a $Sm_2Fe_{17}N_3$ phase is c, and an intensity of a peak derived from a $Sm_2O_3$ phase is e in an X-ray diffraction pattern, and
   wherein the following formula is satisfied:

$$e/c \geq 0.05.$$

5. A method for manufacturing a samarium-iron-nitrogen magnet powder, comprising:
   a step of producing a samarium-iron alloy powder by reducing and diffusing a precursor powder of a samarium-iron alloy;
   a step of nitriding the samarium-iron alloy powder;
   a step of demagnetizing a samarium rich phase present on a surface of the nitrided samarium-iron alloy powder at room temperature by a dry process;

a step of cleaning the powder in which the samarium rich phase is demagnetized with a solvent capable of dissolving a calcium compound, thereby removing the calcium compound from the powder, the step of cleaning the powder being provided separately from the step of demagnetizing the samarium rich phase; and a step of dehydrogenating the cleaned powder, wherein the demagnetizing step is performed before the cleaning step for removing the calcium compound.

* * * * *